(No Model.)

H. LEMP.
ELECTRICAL CONVERTER.

No. 403,541. Patented May 21, 1889.

Witnesses.
Ira R. Steward
Thos. F. Capel

Inventor,
Hermann Lemp
By his Attorney
H. C. Townsend

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ELECTRICAL CONVERTER.

SPECIFICATION forming part of Letters Patent No. 403,541, dated May 21, 1889.

Application filed February 4, 1889. Serial No. 298,657. (No model.)

*To all whom it may concern:*

Be it known that I, HERMANN LEMP, a citizen of the United States, and a resident of Lynn, in the county of Essex and State of Massachusetts, have invented a certain new and useful Improved Converter, of which the following is a specification.

My invention relates to the construction of induction-coils or converters, and to means for obtaining from the secondary a regulable current irrespective of the potential or current flowing in the primary.

The object of my invention is to provide a simple and effective form of converter especially adapted for obtaining currents of low potential but large volume, suitable for use in electric welding and other metal-working operations.

My invention provides a means for regulating the current on the secondary, especially suited for use in those cases where the primary is supplied from a constant potential source.

The invention consists, essentially, in the combination, with a core or carrier of iron of circular, cylindrical, or endless form, upon which one set of the coils is wound, of a magnetic bridge-piece of iron connecting the opposite sides of said core and wound with the other set of coils of the converter. Either set may be the primary; but I prefer to make the first-named set the primary and the set upon the bridge-piece the secondary. Current is passed through the primary in proper manner to form consequent poles at or near the terminals of the bridge, and in order to provide for regulation I wind said coils in a continuous series and connect the series at intervals to the plates of a commutator having two brushes, by which the current may be passed into the primary at any two opposite points, thereby permitting the position of the consequent poles with relation to the terminals of the bridge to be adjusted or varied, so as to regulate the strength of current set up in said secondary.

The primary coils may be wound in any desired fashion; but I prefer to wind them on the circular core or carrier and connect them to a commutator after the fashion of the coils and commutator of a Gramme armature.

Figure 1:
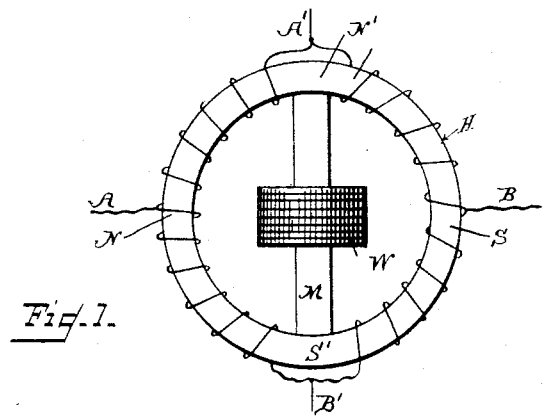
Figure 2:
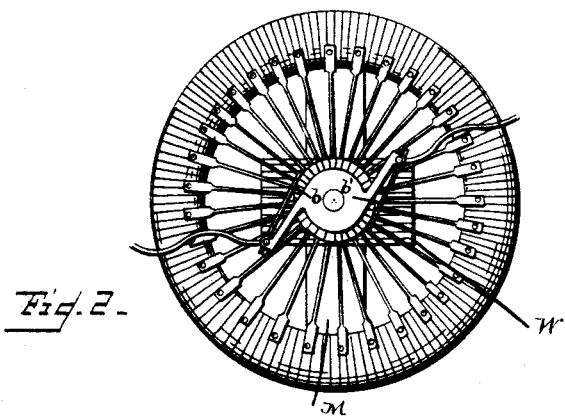
Figure 3:
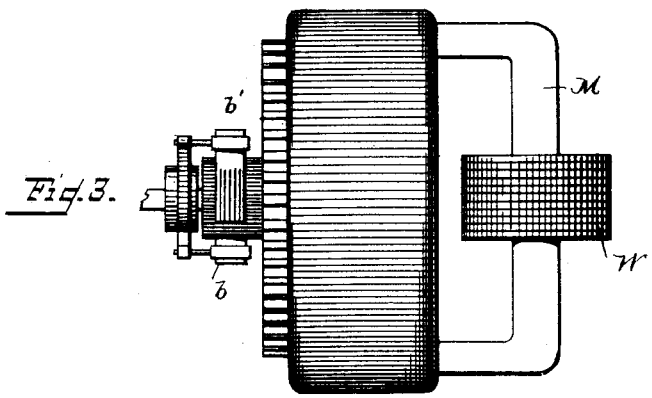

In the accompanying drawings, Figure 1 illustrates diagrammatically the principle of my invention. Fig. 2 is a side elevation of a Gramme ring and commutator with a magnetic bridge-piece carrying one of the coils of the converter. Fig. 3 is an edge view of the same.

Referring to Fig. 1, H indicates a core or ring of iron, preferably laminated, and having a connecting-piece of iron extending radially across from one side to the other, (indicated at M,) and also preferably laminated. The core or carrier H is wound with coils, as indicated, and the bridge M is wound with another set of coils, W, which may be of a number of turns and of proper cross-section to give the desired potential in the secondary circuit.

Let it be assumed that the current from any alternating source is allowed to enter the set of coils on the core H at point A and to leave such coils at the point B. The result will be, as in the Gramme armature, the formation of two circuits or branches through the coils and the production of poles at N S. Under this condition the magnetic bridge M will have no lines of force passing through it, as it joins points of equal magnetic potential, and the coil W will therefore generate no currents. If, however, the current were permitted to enter at A' and leave at B', consequent poles would be produced at N' S' at the terminals of the bridge M, thus causing a large number of lines of force to pass through said bridge and generate a maximum current in the coil W. If a larger number of points of entrance and exit for the primary current were provided, it is obvious that poles might be produced at intermediate positions, each position resulting in the production in the secondary of currents of a strength between the maximum and the minimum. Such provision is indicated in Figs. 2 and 3, where the series of coils wound on the core H is connected at intermediate points to the blocks of a commutator after the manner of an ordinary Gramme armature. Suitable adjustable brushes, $b$ $b'$, bearing on said commutator and connected with the source of supply, permit the electrical shifting of the poles of the primary in obvious manner with a corresponding advantage in the strength of the current in the secondary coil.

The bridge M may be of any desired form. It may be a straight bar extending across from one side of the core to the other, or it may be curved outward, as indicated in Fig. 3, to give room for the coils W.

It will be observed that in adjusting the current in the secondary by the above device the electrical resistance, as well as the number of turns in the primary, is exactly alike under all conditions, thus especially adapting the device for use on mains of constant potential where it is desired to obtain a regulable current of low potential from the secondary.

I do not limit myself to any particular manner of applying the coils to the core or carrier; but they are to be connected to one another and to any suitable switch, so that consequent poles of north and south polarity, respectively, may be produced at opposite sides of the core or carrier and at the points thereof more or less remote from the points where the magnetic bridge touches the core or carrier.

It is obviously not necessary that the core or carrier H should be of exactly circular form.

What I claim as my invention is—

1. In an induction-coil or converter, the combination, substantially as described, of an alternating current primarily wound on an endless core, a magnetic bridge joining the sides of said core and carrying the secondary, and an electric switch connected with the primary coils for varying the position of the poles of the primary with relation to the ends of the bridge.

2. In an induction-coil or converter, the combination, with a circular or endless iron core or carrier having one set of coils wound upon it, of an iron bridge or connecting-piece joining opposite sides of said carrier and wound with a second set of coils constituting the primary or secondary, as the case may be.

3. In an induction-coil or converter, the combination, with an endless core or carrier wound with primary coils in series, of a stationary magnetic bridge-piece, and an adjustable commutator having blocks or plates connected in regular order to the circuit of the primary coils, and commutator-brushes for passing current through said primary in two branches or circuits, as and for the purpose described.

4. A variable-current induction-coil or converter having a primary circuit formed through a commutator and coils constructed after the manner of a Gramme armature, in combination with a secondary wound on an iron bridge-piece connecting opposite sides of the iron core for the primary, as and for the purpose described.

Signed at Lynn, in the county of Essex and State of Massachusetts, this 31st day of January, A. D. 1889.

HERMANN LEMP.

Witnesses:
ELIHU THOMSON,
J. W. GIBBONEY.